Oct. 4, 1932. H. C. NICHOLS ET AL 1,881,222
TIRE CARRIER
Filed July 1, 1929
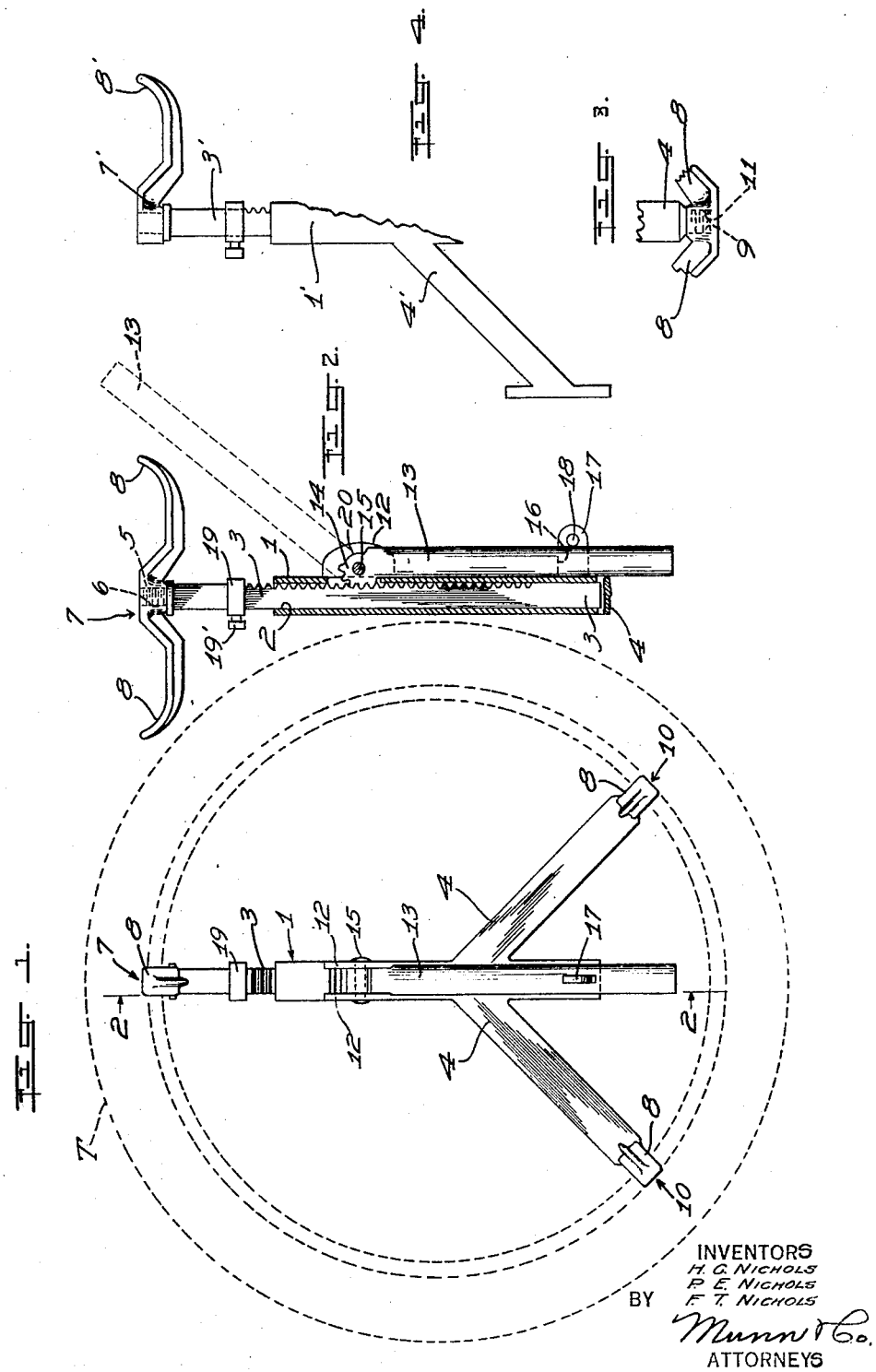
INVENTORS
H. C. NICHOLS
P. E. NICHOLS
F. T. NICHOLS
BY Munn & Co.
ATTORNEYS Patented Oct. 4, 1932

1,881,222

UNITED STATES PATENT OFFICE

HENRY CHESTER NICHOLS, PERCY EARNEST NICHOLS, AND FRANK TENNIS NICHOLS, OF CHICKASHA, OKLAHOMA

TIRE CARRIER

Application filed July 1, 1929. Serial No. 375,276.

Our invention relates to improvements in tire carriers, and it consists in the combinations, constructions, and arrangements herein described and claimed.

An object of our invention is to provide a tire carrier in which novel means is provided whereby tires may be firmly mounted upon the tire carrier.

A further object is to provide a tire carrier in which novel means is provided whereby the tire carrier may be locked in an expanded position.

A further object is to provide a tire carrier in which means is provided whereby the carrier may be quickly expanded or contracted, and in which means is provided whereby a positive action is attained.

A further object is to provide a device which, while primarily designed for carrying spare tires, may also be used for expanding tire rims.

Other objects and advantages will appear in the following specification, and the novel features of the invention will be particularly pointed out in the appended claims.

Our invention is illustrated in the accompanying drawing, forming part of this application, in which Figure 1 is a face elevation of our invention showing a spare tire carried thereby, Figure 2 is a sectional view taken along the line 2—2 of Figure 1, Figure 3 is a fragmentary detail view of a portion of our device, and Figure 4 is a fragmentary view of a modified form of our device.

In carrying out our invention we make use of a guide member 1 rectangular in cross section and provided with an opening 2 within which a rack 3 is slidably disposed. The guide 1 is provided with arms 4, see Figure 1. The arms may be formed integrally with the guide 1. The rack 3 is provided with a threaded shank 5 which is disposed within a threaded opening 6 in a head 7 comprising carrying lugs 8. The arms 4 are also provided with threaded shanks 9, see Figure 3. A head 10 is disposed upon each of the arms 4. The heads 10 are provided with openings 11, see Figure 3, for receiving the threaded shanks 9 associated with the arms 4. The heads 10 are identical with the head 7 in that they are also provided with carrying lugs 8.

In referring to Figures 1 and 2 it will be noted that a pair of lips 12 is mounted upon the guide 1. A lever 13, provided with a gear 14, is pivotally carried by the lips 12 by means of a bolt or rivet 15. The lever is provided with an opening 16 for receiving a lug 17 associated with the guide 1. The lug is provided with an opening 18 for receiving a padlock, not shown, whereby the lever may be locked with respect to the guide 1 in the position shown in Figure 2. A collar 19 is disposed upon the rack 3 for a purpose which will be defined later.

From the foregoing description of the various parts of the device, the operation thereof may be readily understood. In referring to Figure 2 it will be seen that the rack 3 may be moved relatively with respect to the guide 1 when the lever 13 is operated. In other words, by moving the lever upwardly the rack 3 and the head 7 will be moved inwardly with respect to the guide 1. When the lever 13 has been moved to a position substantially at right angles to the guide 1 the rack 3 will have been moved to a position for bringing the collar 19 into engagement with the end of the guide.

At this time the device is in a contracted position. The device shown in Figures 1 and 2 is primarily designed to be employed in connection with a vehicle having means for carrying an extra spare tire. When the device is in its contracted position the lugs 8, upon that side of the device opposite the lever 13, are moved inside the rim of the spare tire and a second spare tire is placed upon the carrying lugs upon the opposite side of the device, at which time the lever 13 may be moved to the full line position shown in Figure 2. It will thus be seen that the device may be expanded for rigidly securing the device with respect to the spare tire carried by the vehicle and also for retaining the second tire.

In referring to Figure 2 it will be noted that the gear portion of the lever 13 is provided with a cutaway portion 20. When the lever 13 is moved to the dotted line position, the cutaway portion 20 will be disposed adjacent the rack 3. At this time the gear 14 is out of mesh with the rack and the latter may be moved independently of the gear any desired distance. The collar 19 permits the rack to be adjusted for various sizes of tire rims. In other words the collar may be permanently fixed upon the rack through the medium of a set screw 19' for a given size of tire rim. The collar determines the amount of contraction. The amount of expansion may be easily determined by adjusting the device with respect to a given tire rim and the collar then adjusted whereby the device will be permanently adjusted so far as tire rims of that particular size are concerned.

In referring to Figure 2 it will be noted that the carrying lugs 8 are so formed that the tire rim will be seated in such a manner as to eliminate rattling and shaking of the tires with respect to the device. In other words, the carrying lugs are so constructed that they act as centering means for the rims. In Figure 1 we have shown our tire carrier as applied to a tire and rim indicated generally at T. When the lever 13 is in the full line position shown in Figure 2 the lever may be firmly locked by inserting a padlock in the opening 18. Thus it will be seen that when the tire carrier is locked in its expanded position the device is rigidly supported by the supporting tire carried by the vehicle and that the spare tire, carried by the tire carrier, is also rigidly fixed upon the latter.

In Figure 4 we have shown a slightly modified form of our invention in which the guide member 1' is provided with a bracket 4' arranged to be secured to a vehicle or other supporting means. In this form of the device we have provided a head 7' upon the rack 3' and provided with a single carrying lug 8. In this form we also provide arms such as those indicated at 4 in Figure 1. Each head is provided with a single carrying lug. In this form of the device the tire carrier is permanently fixed with respect to the vehicle or other supporting means. Both forms of our invention may be employed for expanding rims in lieu of the usual rim tools.

We claim:

In a tire carrier the combination of a tubular body portion provided with a pair of diverging leg portions, a rack member movably extending within the body portion and provided with teeth, a lever member pivotally connected with the body portion and provided with a pinion portion, said pinion portion extending through an opening in the body portion and having teeth in engagement with the teeth of said rack member whereby the rack member may be moved when the lever is actuated, gripping arms connected with said rack member and leg portions, a collar adjustably connected with the rack member for limiting the movement of said rack member with respect to the body portion when the lever is actuated, said collar also being adapted for limiting the movement of the lever, and a lug portion connected with the body portion and extending through an opening in the lever whereby said lever may be retained in a fixed position.

Signed at Chickasha, in the county of Grady and State of Oklahoma this 22nd day of June, A. D. 1929.

HENRY CHESTER NICHOLS.
PERCY EARNEST NICHOLS.
FRANK TENNIS NICHOLS.